Aug. 13, 1935.  C. A. PERSONS  2,011,233
TOW LINE
Filed April 18, 1933  3 Sheets-Sheet 1
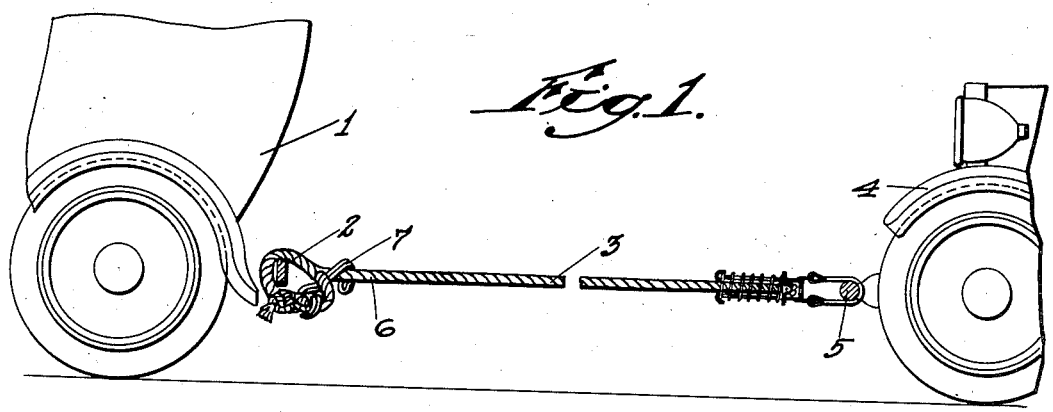
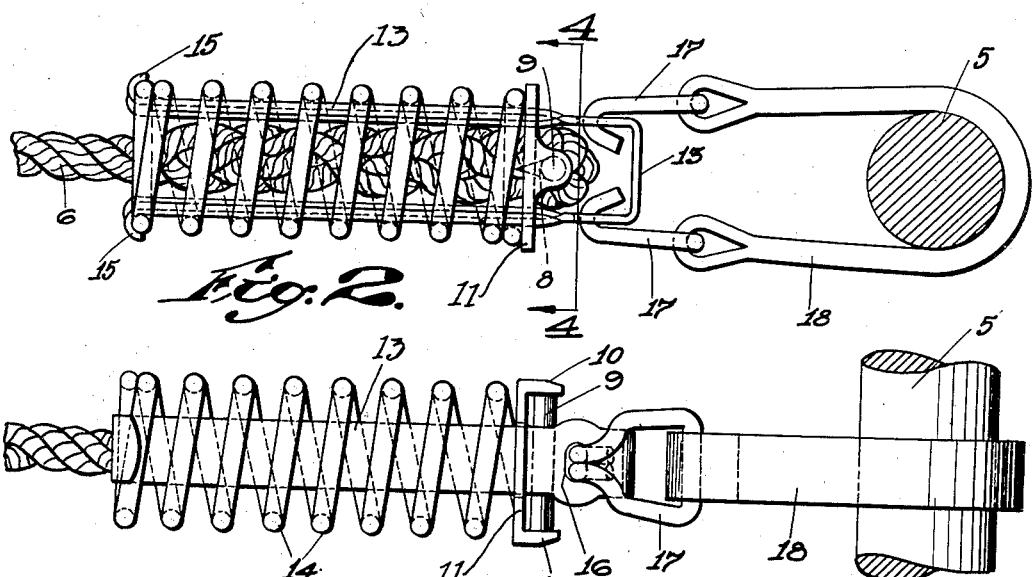
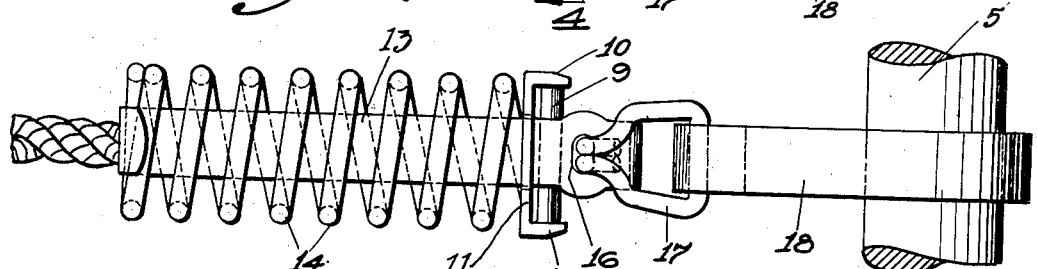
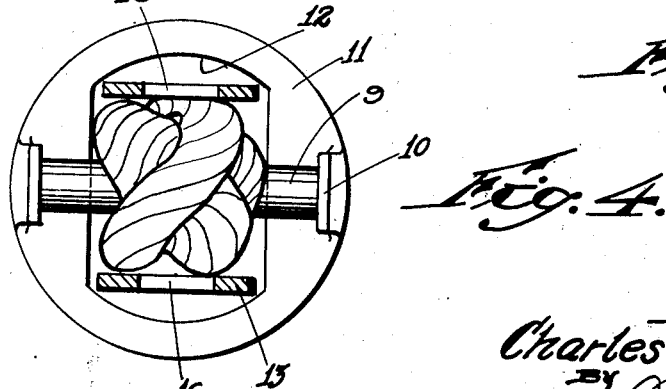
Inventor:
Charles A. Persons
By Owen N. Kennedy
Attorney

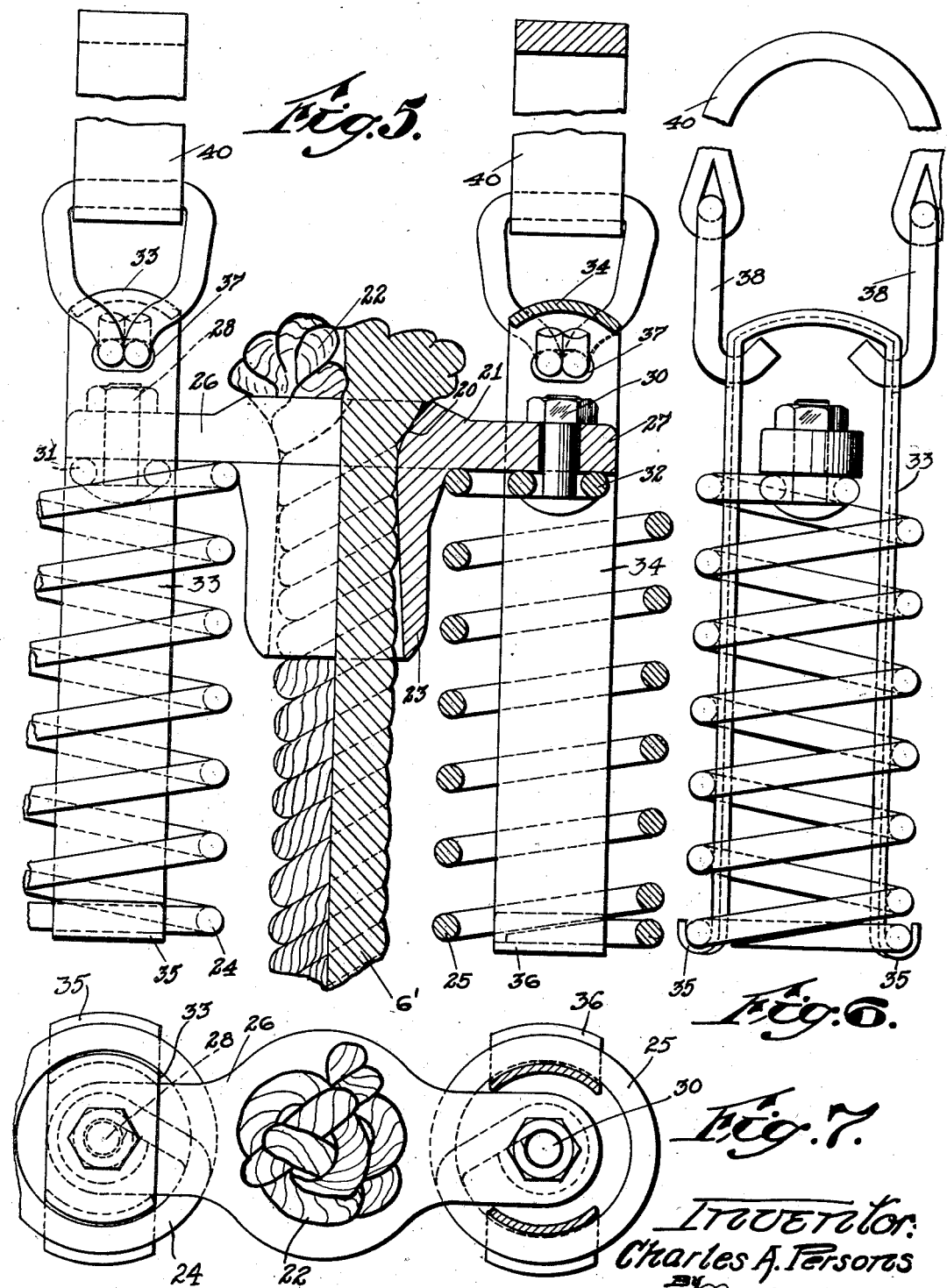

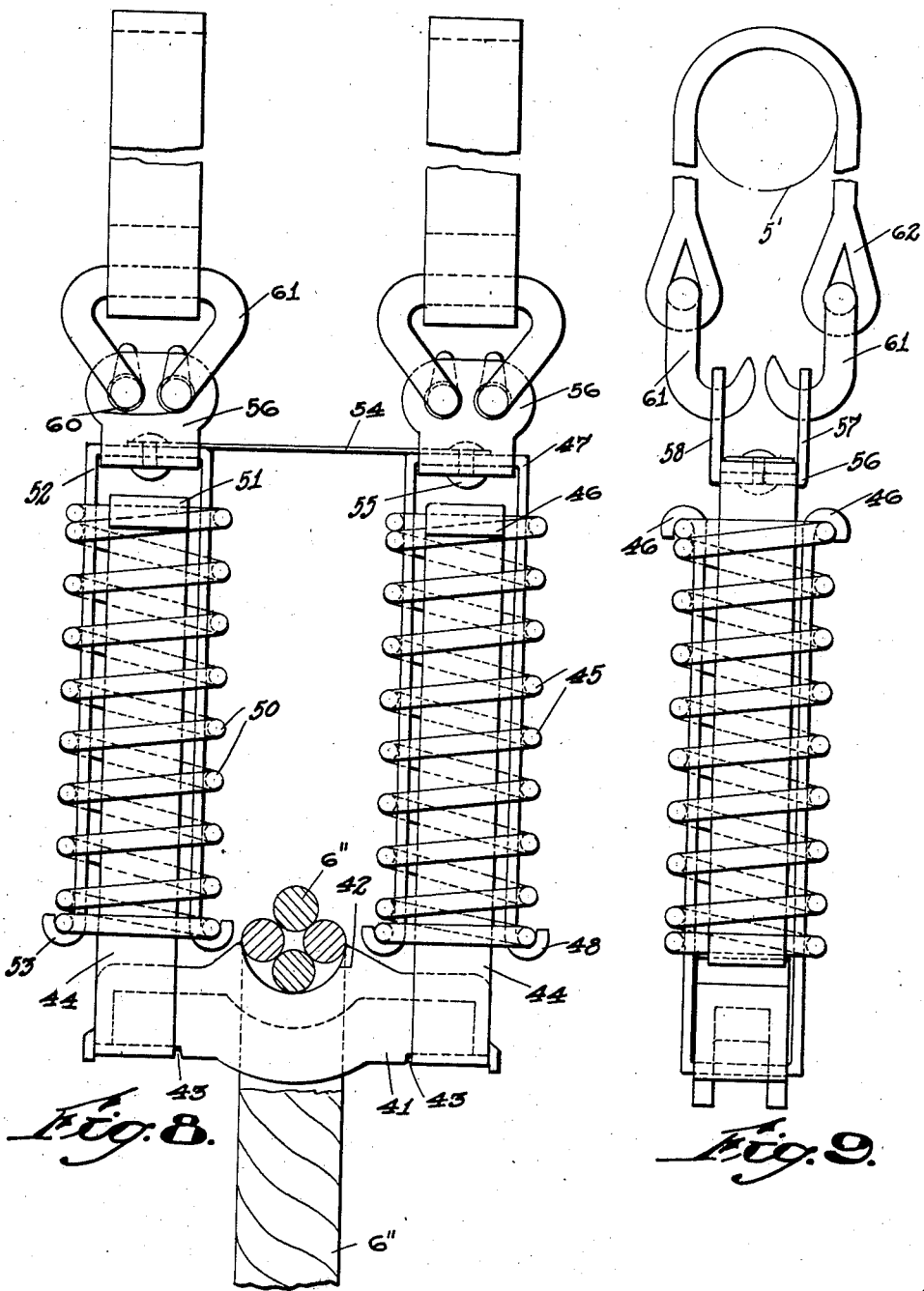

Patented Aug. 13, 1935

2,011,233

UNITED STATES PATENT OFFICE 2,011,233

TOW LINE

Charles A. Persons, Worcester, Mass., assignor to Persons-Majestic Manufacturing Company, Worcester, Mass., a corporation of Massachusetts Application April 18, 1933, Serial No. 666,703

5 Claims. (Cl. 280—33.14)

The present invention relates to an improved tow-line for use in connection with automotive, or any other heavy vehicles.

In towing of one vehicle by another, any tow-line will be subjected to sudden pulls resulting from uneven starting, stopping, or braking of the connected vehicles and the consequent severe strains result in frequent breakage, whether the line be made of hemp, rope or wire cable. Provision of a heavier line to avoid breakage merely transfers the strain from the line to the connected parts of the vehicles, such as the bumpers, so that bumpers or other parts of the vehicles are frequently bent out of shape, thereby marring the appearance of the vehicles and in some cases affecting the proper operation thereof.

It is, accordingly, the principal object of the present invention to provide a tow-line having a resilient portion which will take up any sudden strains in such a manner as to reduce the possibility of breakage of the material of the tow-line itself, as well as to prevent damage of the parts to which the line is connected.

Other and further objects and advantages of the invention will appear from the following detailed description taken in connection with the accompanying drawings in which:—

Fig. 1 is a view in elevation, illustrating the use of a tow-line embodying the invention.

Fig. 2 is a view, on an enlarged scale, of one end of the tow-line.

Fig. 3 is a plan view of the parts shown in Fig. 2.

Fig. 4 is a section along the line 4—4 of Fig. 2.

Fig. 5 is a view partly in plan, and partly in section, showing a modification of the invention.

Fig. 6 is a view in side elevation of the parts of Fig. 5.

Fig. 7 is a view in end elevation, looking from the top of Fig. 5, with the attaching hooks removed.

Fig. 8 is a plan view showing a further modification of the invention.

Fig. 9 is a view in side elevation of the parts of Fig. 8.

Like reference characters refer to like parts in the different figures.

Referring first to Fig. 1, the towing vehicle 1, the rear portion only of which is indicated, provides the usual bumper 2 extending transversely at the rear thereof, and one end of a tow-line 3 embodying the invention is secured around said bumper, or to any other accessible part of the vehicle. The tow-line 3 provides a connection between the vehicle 1 and a vehicle 4 to be towed, and the latter vehicle provides the usual front bumper 5, or other accessible part, to which the other end of the tow-line 3 is secured, as will hereinafter appear. The tow-line 3 comprises a length of flexible material preferably rope, as indicated at 6, and an open hook 7 secured at one end thereof provides convenient means for releasably securing the line to the vehicle 1, after passing it around the bumper 2.

The tow-line provides a resilient connection between the two vehicles 1 and 4, and to this end, the opposite end of the rope 6 remote from the hook 7 is provided with an eye 8 preferably formed by turning the end of the rope over upon itself and splicing the strands of the turned-over end into the main portion thereof, as best shown in Fig. 2. A pin 9 which passes through the eye 8 in the rope 6 is received in ears 10 provided by an annular plate 11, and the latter has an opening 12 therein for the reception of a U-shaped yoke 13 on which the plate is slidable. A heavy compression spring 14, which engages at one end with the plate 11, surrounds the legs of the yoke between which the end of the rope 6 is received and the ends of the legs of the yoke are provided with outwardly extending feet 15 for engagement with the end of the spring 14 opposite to the end engaging the plate 11. The positioning of the end of the rope 6 between the legs of the yoke 13 protects the spliced portion thereof from engagement with the coils of the spring 14, thereby eliminating wear of the rope 6. The spring is arranged to function under compression resulting from a pull on the rope 6, the tension on said rope tending to move the plate 11 toward the feet 15 on the yoke. The legs of the yoke adjacent the base are provided with alined openings 16 which receive the bent-over ends of wire hooks 17 secured to the opposite ends of a heavy flexible strap 18. The latter encircles the bumper 5 on the towed vehicle and provides a releasable connection between the yoke and the vehicle.

When the towing vehicle is started, the tension on the rope 6 is transmitted through the compression spring 14 to the towed vehicle rather than directly thereto, thereby avoiding any sudden strain on either of the vehicles. When a sudden strain is placed on the rope, the spring 14 is compressed, temporarily, until the strain is relieved and the spring then returns to the normal position shown, in readiness to absorb any further strains to which the rope may be subjected. The tow-line thus provides a resilient, or shockless, connection between the two vehicles connected thereby, and materially reduces the maximum tension to which the line is subjected. Since the spring 14 functions as a compression spring, it is not subject to distortion beyond the elastic limit, as will be apparent, and a heavy strain on the rope will not permanently distort the spring.

In the modification shown in Figs. 5, 6, and 7, the end of the rope 6', not shown, is preferably provided with a suitable hook corresponding to the hook 7; the opposite end of the rope being passed through an opening 20 in a connecting plate 21. This end of the rope is formed into a knot 22 of sufficient size to prevent the rope from being drawn through the opening 20 in the plate 21 and the latter is provided with a cylindrical flange 23 surrounding the rope to aid in supporting the plate in proper relation thereto. In this modification, the resilient connection between the two vehicles embodies two parallelly-arranged coil springs 24 and 25 which operate together in absorbing the shocks and sudden strains on the tow line. The plate 21 is provided with oppositely extending ears 26 and 27 for the reception of bolts 28 and 30, the bolts 28 and 30 passing through the end coils 31 and 32 of the springs 24 and 25 for supporting the springs in parallel relation to the axis of the opening 20 in the plate 21, as well as the general longitudinal axis of the rope 6.

Each of the springs 24 and 25 has a U-shaped yoke 33 and 34, the legs of which extend through said springs and the legs of each yoke extend on opposite sides of the ears formed on the plate 20. The ends of the legs of the yokes are provided with laterally extending feet 35 and 36 which receive the ends of the springs remote from the end coils 31 and 32 respectively. Each yoke 33 and 34 is provided adjacent the base with alined openings 37 which receive the bent ends of wire hooks 38 secured in the opposite ends of heavy straps 40, one strap being provided for each yoke. Each of the straps 40 is passed around a bumper, or other suitable part of one of the vehicles connected by the tow-line as in the manner of strap 18 above. A pull on the rope 6' being transmitted through the compression springs 24 and 25 to the straps 40, the tow-line thus provides a resilient shockless connection between the two vehicles connected by said rope. The provision of a pair of springs acting in parallel with each other adapts this structure for use in the towing of heavy vehicles and so this modified construction is particularly useful for towing trucks, busses, and other similar vehicles.

The modification of Figs. 8 and 9 provides a still further type of resilient connection adapted for the towing of heavy vehicles. In this modification, the rope 6" is provided at one end, not shown, with a suitable hook corresponding to the hook 7 for connecting the end of said connector to a vehicle, the opposite end passing around a connecting member 41 which is provided with a suitable groove 42 in which the rope is received. The connecting member 41 is provided at opposite ends with recesses 43, in each of which is seated the base of a U-shaped yoke 44. The legs of one of the yokes 44 extend through a compression coil spring 45 and the ends of the legs of the yoke are provided with laterally-extending feet 46 for engagement with the end coils of the spring 45. The legs of a similar yoke 47 extend through the spring 45 in a direction opposite to the legs of the yoke 44 and the ends of the legs of the yoke 47 are provided with laterally-extending feet 48 for engagement with the end of the spring 45 remote from the end coil engaged by the laterally-extending feet 46.

The legs of the other yoke 44 on the opposite end of the connecting member 41 extend through a coil spring 50 similar to and extending parallel with the spring 45 and the ends of the legs of this yoke are provided with laterally-extending feet 51 engaging the end coil of the spring 50. A second yoke 52 also extends through the spring 50 in a direction opposite to the yoke 44 and laterally-extending feet 53 on the ends of the legs of said yoke 52 engage the end coils of the spring remote from the coil engaged by the feet 51. The bases of the yokes 47 and 52 are connected together by a spacing strip 54 which holds said yokes apart and which, in conjunction with the connecting member 41, supports the springs 45 and 50 in parallel relation to each other.

Rivets 55 which connect the strip 54 to the bases of the yokes 47 and 52 also fasten each yoke to a connector 56 having parallel projecting ears 57 and 58. The ears of each connector 56 are provided with spaced openings 60 for the reception of the opposite ends of wire hooks 61 secured as shown in Fig. 9 to the ends of a flexible strap 62. A separate strap is provided for each connector 56 and each strap passes around a bumper 5' or other part of a vehicle to which the tow-line is connected, as in the manner of the strap 18 above described. This tow-line with the parallelly-arranged springs 45 and 50 is particularly useful in towing heavy vehicles such as trucks and busses, and the springs 45 and 50 are adapted to absorb extremely heavy shocks or strains on the tow-line.

The invention thus provides a resilient shockless connection between two vehicles to which the tow-line is connected, and the structure is arranged to eliminate excessive strain on the rope or on the vehicles connected thereby.

I claim,

1. In a tow-line, a flexible connector, a compression spring, a plate engaging one end of said spring, said connector extending through said spring and being secured to said plate, a U-shaped yoke extending through said spring from the end adjacent the plate and having the ends thereof engaging with the opposite end of said spring, the legs of said yoke extending between the end of the connector and the coils of the spring, and means for attaching said yoke to a vehicle.

2. In a tow-line, a compression spring, a plate engaging one end of said spring, a flexible connector extending through said spring and having one end secured to said plate, a U-shaped yoke passing through said compressing spring and having the ends of the legs thereof engaging the end of the compression spring remote from the plate, said yoke being positioned between the end of the flexible connector and the coils of the spring.

3. In a tow-line, a flexible connector, a compression spring surrounding one end of said connector, means for securing the end of said connector to one end of the spring, a yoke extending through said spring and engaging the end of said spring opposite to the end to which connector is secured, and a flexible strap having hooks in the opposite ends thereof for engagement with openings in said yoke, said strap providing means for releasably securing said yoke to a vehicle.

4. In a tow-line, a flexible connector, a compression spring surrounding one end of said connector, a plate engaging with one end of said spring, the end of said connector being secured directly thereto, a yoke extending through said spring and engaging with the opposite end thereof, and attaching means secured to said yoke at the end remote from the point of engagement of said yoke with the spring for attachment of said yoke to a vehicle.

5. In a tow-line, a flexible connector, a compression spring surrounding one end of said connector, a plate engaging with one end of said spring, the end of said connector within the spring being secured directly to said plate, a yoke extending through said spring and engaging the end of said spring opposite to the end engaged by said plate, and a flexible strap having hooks in the the opposite ends thereof for engagement with openings in said yoke, said strap providing means for releasably securing said yoke to a vehicle.

CHARLES A. PERSONS.